(12) United States Patent
Wilson et al.

(10) Patent No.: US 11,747,124 B2
(45) Date of Patent: Sep. 5, 2023

(54) TWO-WAY TAPE GUIDE ASSEMBLY

(71) Applicant: APEX BRANDS, INC., Apex, NC (US)

(72) Inventors: Cecil McKinley Wilson, Sanford, NC (US); Nicholas Ryan Imsand, Huntersville, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/800,329

(22) PCT Filed: Mar. 3, 2021

(86) PCT No.: PCT/US2021/020633
§ 371 (c)(1),
(2) Date: Aug. 17, 2022

(87) PCT Pub. No.: WO2021/178509
PCT Pub. Date: Sep. 10, 2021

(65) Prior Publication Data
US 2023/0068116 A1 Mar. 2, 2023

Related U.S. Application Data

(60) Provisional application No. 62/985,166, filed on Mar. 4, 2020.

(51) Int. Cl.
*G01B 3/1046* (2020.01)
*G01B 3/1041* (2020.01)
*B44D 3/38* (2006.01)

(52) U.S. Cl.
CPC .............. *G01B 3/1046* (2020.01); *B44D 3/38* (2013.01); *G01B 2003/1053* (2013.01)

(58) Field of Classification Search
CPC .......... G01B 3/1046; G01B 2003/1053; G01B 3/1005; B44D 3/38
See application file for complete search history.

(56) References Cited

U.S. PATENT DOCUMENTS

| | | | |
|---|---|---|---|
| 2,505,653 A | 4/1950 | Shillman | |
| 5,718,056 A | 2/1998 | Miyasaka et al. | |
| 6,257,514 B1* | 7/2001 | Morris | G11B 15/62 |
| 6,744,593 B1* | 6/2004 | Nayak | G11B 15/67 |
| | | | 242/348 |
| 7,415,778 B1 | 8/2008 | McEwan et al. | |
| 7,520,461 B1* | 4/2009 | Rudi | G11B 15/674 |
| | | | 242/532.6 |
| 2013/0014399 A1 | 1/2013 | Hall | |
| 2017/0089682 A1 | 3/2017 | Feuerstein et al. | |
| 2018/0120074 A1 | 5/2018 | Orsini et al. | |
| 2022/0185006 A1* | 6/2022 | Wilson | B44D 3/38 |
| 2023/0068116 A1* | 3/2023 | Wilson | B44D 3/38 |

OTHER PUBLICATIONS

International Search Report and Written Opinion from International Application No. PCT/US2021/20633 dated May 24, 2021, all pages cited in its entirety.

* cited by examiner

*Primary Examiner* — Yaritza Guadalupe-McCall
(74) *Attorney, Agent, or Firm* — Burr & Forman LLP

(57) ABSTRACT

A guide assembly for a tape measuring device may include an inner guide portion facing a reel assembly of the tape measuring device, and an outer guide portion facing away from the reel assembly. The guide assembly may be configured to enable the tape to be paid out from an aperture of the tape measuring device in both lateral directions relative to the aperture.

20 Claims, 8 Drawing Sheets

TWO-WAY TAPE GUIDE ASSEMBLY

TECHNICAL FIELD

Example embodiments generally relate to a tape measuring devices or chalk boxes, and more particularly relate to such devices having an improved guide assembly for an exit port thereof.

BACKGROUND

Long tape measuring devices typically have lengths so long (e.g., greater than 25 or 50 feet) that a spring-based or other automatic retraction assembly is either not possible or not desirable. Thus, these devices typically have a flexible and flat tape (e.g., made of fiberglass or other materials) that is wound onto a reel or reel assembly. An end hook is affixed to the distal end of the tape, and can be pulled, thereby extracting tape from the reel assembly, to place the end hook at a first point that is distant from a second point near which the remainder of the tool will be retained. Alternatively, the end hook could be affixed to the first point and the remainder of the tool can be moved to the second point while withdrawing tape from the reel assembly. In either case, the end hook retains the tape at the first point, and the user may make measurements, using markings provided on the tape, along a line between the first and second points. After measuring is complete, the user often operates a rotatable handle that is operably coupled to the reel assembly to retract the tape back onto the reel or drum thereof.

Chalk boxes operate similarly in relation to extending and retracting line onto a reel assembly. However, chalk boxes generally use line instead of tape, and the line is exposed to chalk dust in a reservoir that is refillable. The chalk dust can then be applied via snapping or plucking the line, but is otherwise paid out, retained at an anchor point, reeled in, and retained on the reel assembly similar to the description above.

The processes described above, and the tools adapted for performing the processes, are both very old. However, equally old in relation to these tools, is the fact that the conventional design for the tools provides a housing structured so that the exit port through which the tape or line exits the housing is directed to one side. Effectively, this means that the tape or line is meant to be extended in only one direction relative to the housing. Thus, if the tape or line is extended in another direction, or if slack in the tape or line is experienced during rewinding, it is possible for the tape or line to twist either on the reel assembly or in the exit port, and potentially get caught, or otherwise operate in a less than optimal fashion.

BRIEF SUMMARY OF SOME EXAMPLES

Some example embodiments may enable the provision of a measuring device that has an improved design, which enables the flexible measuring media to be extended and retracted without getting twisted. Accordingly, the disadvantages discussed above may be overcome.

In an example embodiment, a tape measuring device is provided. The tape measuring device may include a housing having an aperture, a reel assembly disposed in the housing, a tape having a first end operably coupled to the reel assembly and a second end configured to extend from the housing through the aperture, a retraction assembly configured to interface with the reel assembly to enable the tape, after extension from the housing to be wound onto the reel assembly, and a guide assembly provided to define the aperture. The guide assembly may include an inner guide portion facing the reel assembly, and an outer guide portion facing away from the reel assembly. The guide assembly may also be configured such that the tape encounters the guide assembly tangent to each of the inner guide portion and the outer guide portion.

In another example embodiment, a tape measuring device may be provided. The tape measuring device may include a housing having an aperture, a reel assembly disposed in the housing, a tape having a first end operably coupled to the reel assembly and a second end configured to extend from the housing through the aperture, a retraction assembly configured to interface with the reel assembly to enable the tape, after extension from the housing to be wound onto the reel assembly, and a guide assembly provided to define the aperture. The guide assembly may include an inner guide portion facing the reel assembly, and an outer guide portion facing away from the reel assembly. The guide assembly may also be configured to enable the tape to be paid out from the aperture in both lateral directions.

In another example embodiment, a guide assembly for a tape measuring device is provided. The guide assembly may include an inner guide portion facing a reel assembly of the tape measuring device, and an outer guide portion facing away from the reel assembly. The guide assembly may be configured to enable the tape to be paid out from an aperture of the tape measuring device in both lateral directions relative to the aperture.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
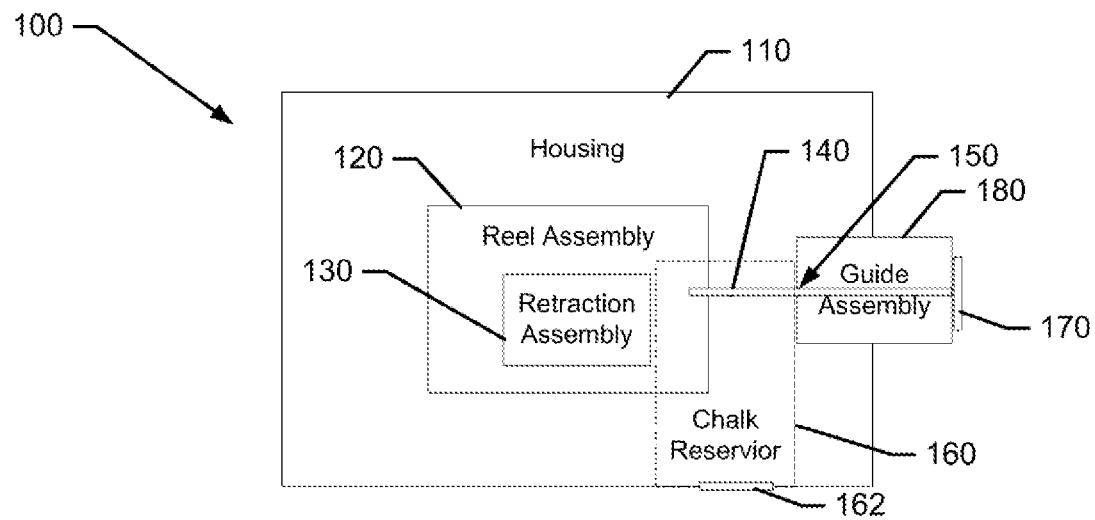
FIG. 1 illustrates a block diagram of a measuring device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 2:
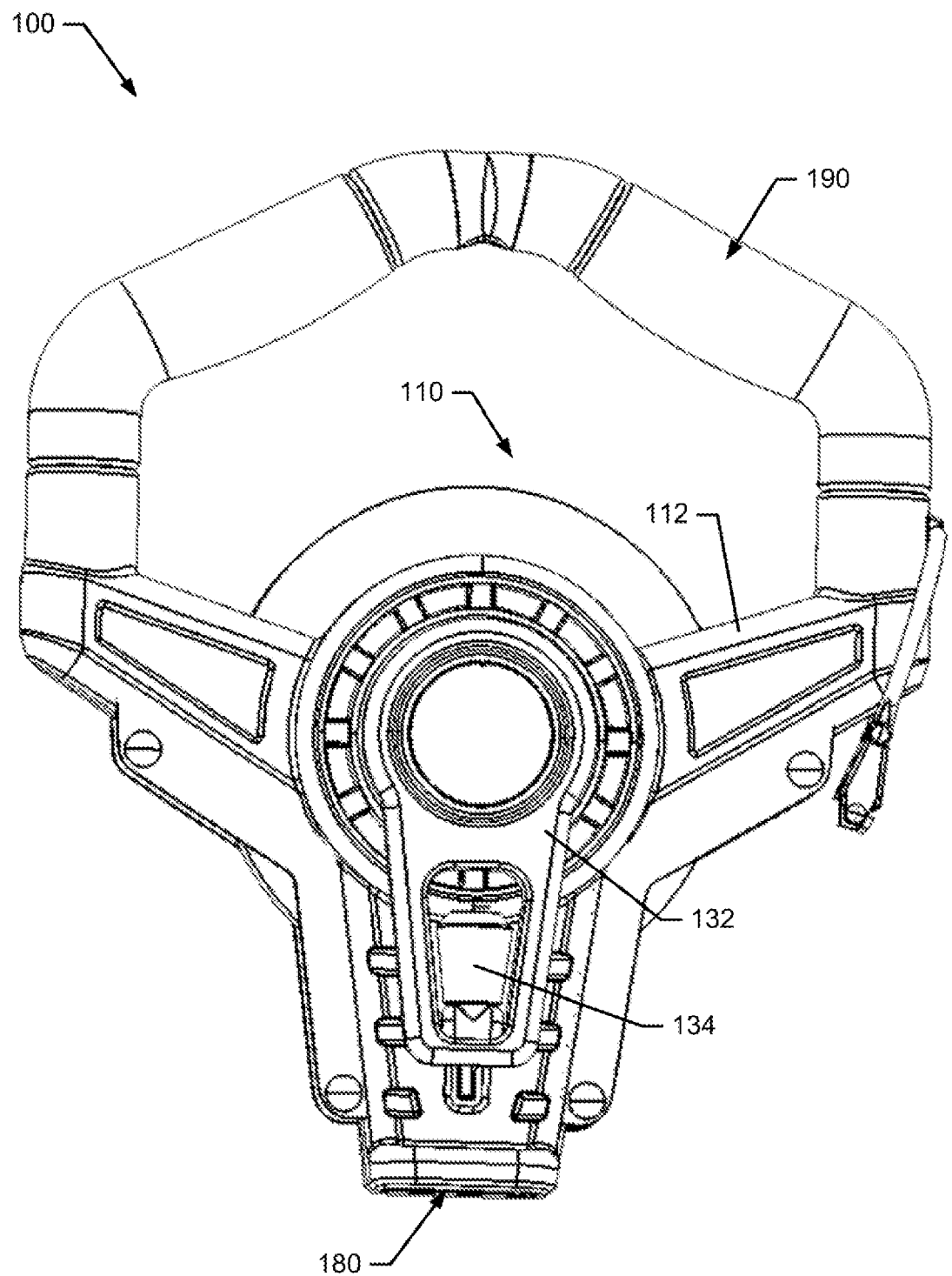
FIG. 2 illustrates a front view of the measuring device in accordance with an example embodiment.
Figure 3:
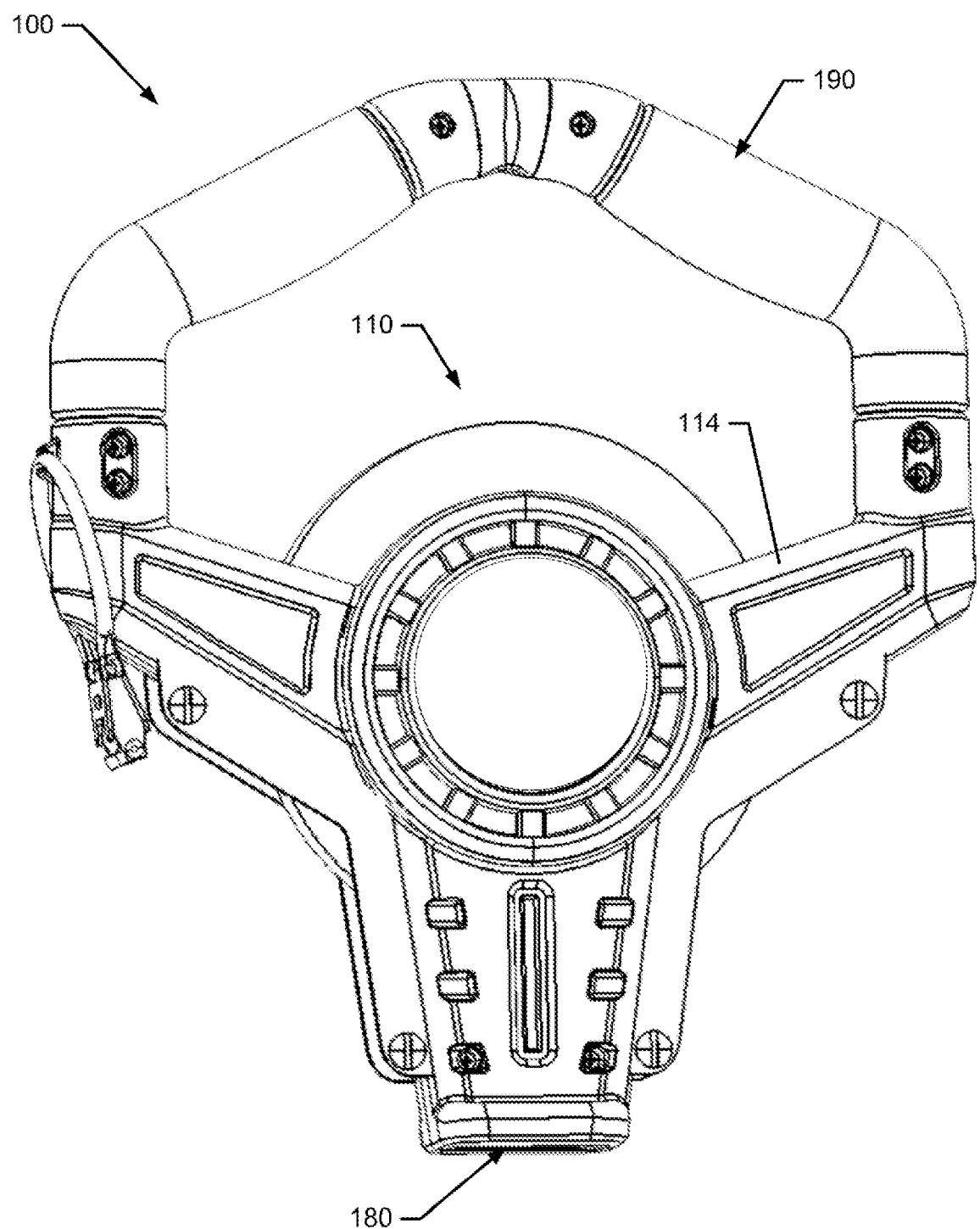
FIG. 3 illustrates a rear view of the measuring device in accordance with an example embodiment.
Figure 4A:
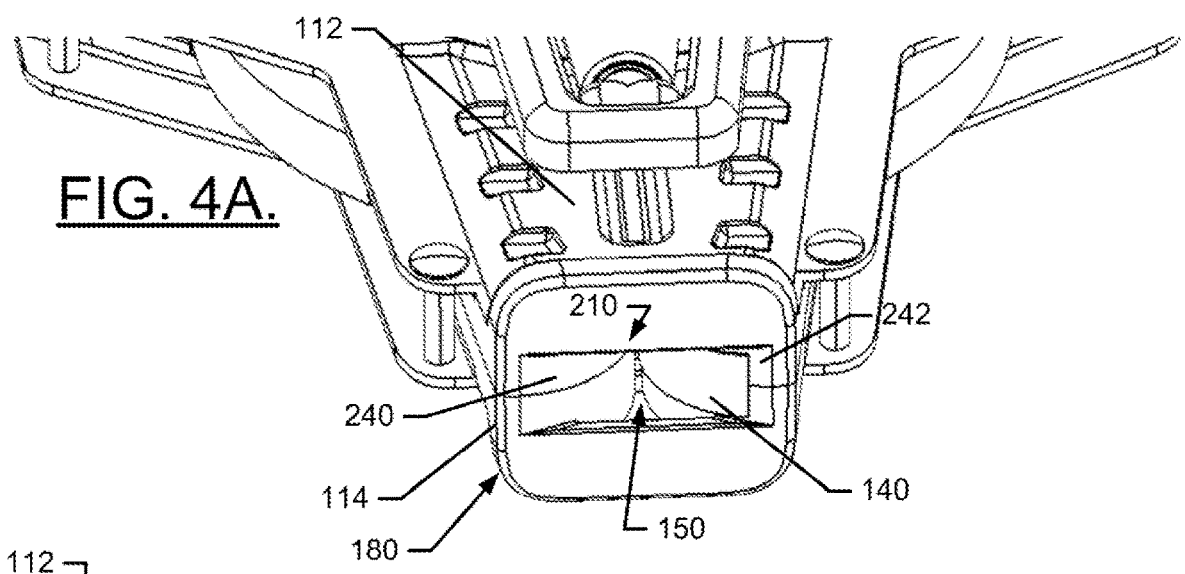
FIG. 4A illustrates a perspective view of a bottom side of the measuring device in accordance with an example embodiment.
Figure 4B:
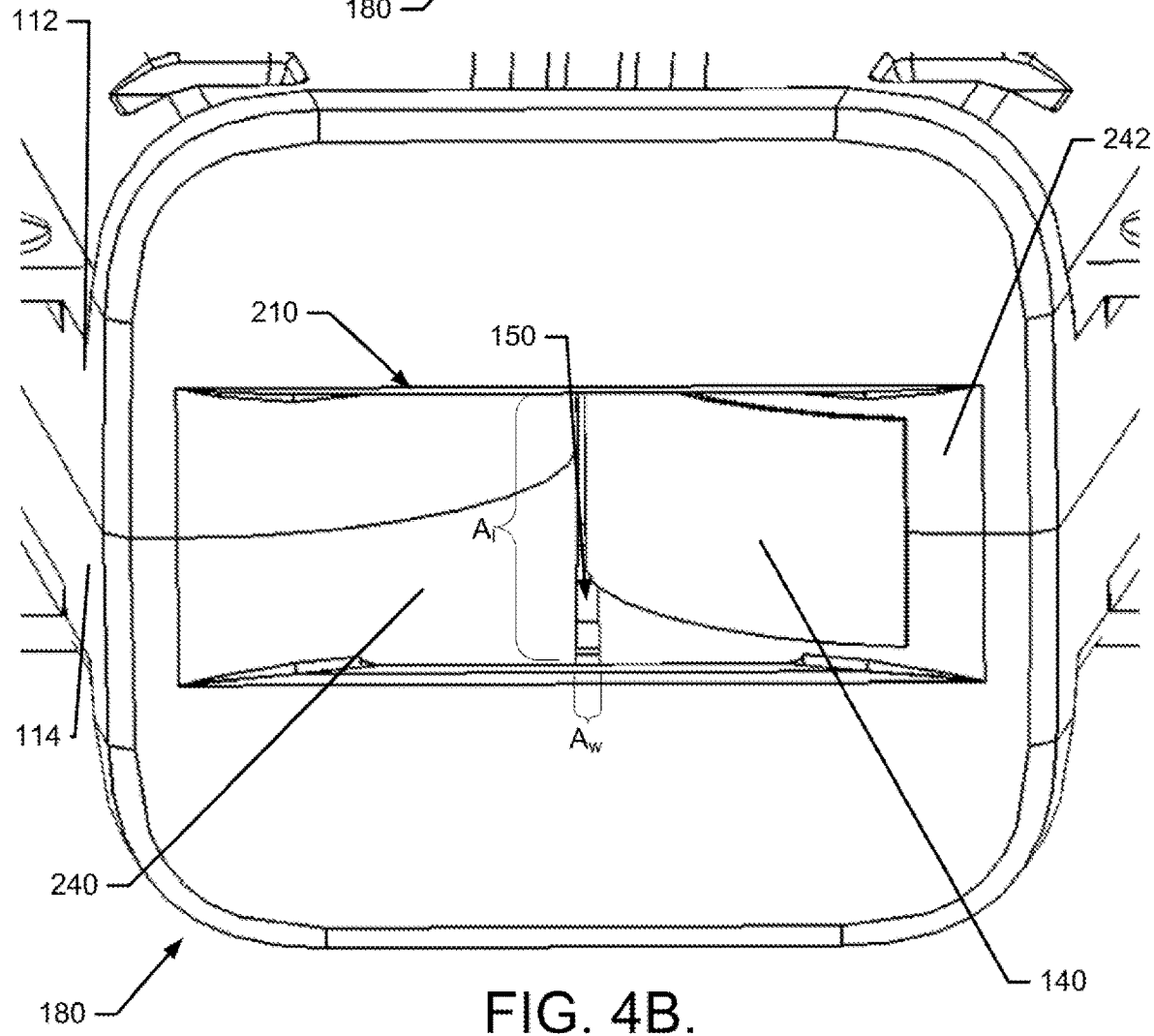
FIG. 4B shows a closer view of an exit port area of the measuring device in accordance with an example embodiment.

As indicated above, some example embodiments may relate to the provision of a measuring device (e.g., a chalk box or a long tape measuring device) that may have an improved design for the aperture (i.e., the exit (or entrance) port through which the flexible measuring media is extended or retracted). This may also, and advantageously, be accomplished using a design that can be injection molded to simplify the design and reduce costs associated therewith. FIG. 1 illustrates a block diagram of a measuring device 100 in accordance with an example embodiment, and FIGS. 2 and 3 illustrate front and rear views, respectively, of the measuring device 100. FIG. 4A illustrates a perspective view of a bottom side of the measuring device 100, and FIG. 4B focuses in on the exit port area of the measuring device 100.

Referring now to FIGS. 1-4B, the measuring device 100 of an example embodiment may include a housing 110 comprising a first case half 112 and a second case half 114. The first and second case halves 112 and 114 may house a reel assembly 120 and a retraction assembly 130 therein. A flexible measuring media (e.g., tape 140) may be wound onto the reel assembly 120 and may be alternately withdrawn from and retracted back onto the reel assembly 120. The retraction back onto the reel assembly 120 may be accomplished via the retraction assembly 130, which may include a crank 132 and a foldable knob 134 that is folded in to nest inside a portion of the crank 132 proximate to the first case half 112, and folded out in order to enable the user to turn the crank 132 about an axis of the reel assembly 120. When the knob 134 is folded out and turned, the reel assembly 120 may be configured to rotate either once for each rotation of the crank 132, or multiple times (dependent upon the configuration of the retraction assembly 130). In this regard, in some cases, the retraction assembly 130 may include a hub that is operably coupled to the crank 132, and that rotates and is operably coupled to a gear assembly that may provide multiple rotations of a drum or reel of the reel assembly 120 for each respective rotation of the knob 134 and the crank 132.

The tape 140 may be paid out through an aperture 150 formed in a portion of the housing 110. The aperture 150 may be formed to be slightly larger than a length and width of the tape 140. The tape 140 may therefore be retained on the reel assembly 120 before passing out the aperture 150. The tape 140 may also include an end hook 170 disposed at one end thereof, and the tape 140 is affixed to the reel assembly 120 at the other end of the tape 140. The end hook 170 may be affixed (temporarily) to an anchor point on a medium or surface that is to be marked. Once the end hook 170 is affixed to the anchor point, the tape 140 may be paid out of the aperture 150 and unwound from the reel assembly 120. When a desired length of the tape 140 has been paid out, the user can make any necessary measurements using the tape 140 as described above. The end hook 170 may then be released from the anchor point, and the crank 132 and knob 134 may be used to operate the retraction assembly 130 to wind the tape 140 back onto the reel assembly 120 by drawing the tape 140 back into the housing 110 via the aperture 150. The measuring device 100 may also include a handle 190, which may be operably coupled to the housing 110 or which may be integrally formed as part of the first and second case halves 112 and 114.

The tape 140 is flat and non-metallic (e.g., fiberglass ribbon or cloth), and is one example of a flexible measuring media that could be used in example embodiments. Moreover, the tape 140 may be associated with situations in which the measuring device 100 is embodied as a long measuring tape device (e.g., having greater than 25 feet of tape 140). However, example embodiments could also be applied where the measuring device 100 is a chalk box. In such cases, the flexible measuring media may instead be referred to as a line or string, and the line may be exposed to chalk in a chalk reservoir 160 (shown in dashed lines in FIG. 1 to illustrate the alternative and/or optional nature thereof). If employed, the aperture 150 may be formed to be slightly larger than a diameter of the line, and may further house or retain a filter or wiping member, such as a piece of felt or other material that prevents excess escape of chalk from a chalk reservoir 160 that is exposed to the line while the line is inside the housing 110, and also removes excess chalk from the line as the line is withdrawn from the housing 110. The felt may be held in place by a retaining wire or other structure. The line may therefore pass through or be retained in the chalk reservoir 160 before passing out the aperture 150. In an example embodiment, the chalk reservoir 160 may include a plug 162 that is accessible from outside the housing 110 to be removed to enable refilling of the chalk reservoir 160. The plug 162 of this example is located at a bottom portion of the housing 110, but other locations for the plug 162 are also possible.

Although the measuring device 100 may be a chalk box or measuring tape device, the figures that follow will be described in reference to an example in which the measuring device is a long measuring tape device (e.g., having greater than 25 feet of the tape 140), and therefore the flexible measuring media will be exemplified by the tape 140 in the discussion that follows. Whether the flexible measuring media is line or the tape 140, the aperture 150 may be disposed at a guide assembly 180 of an example embodiment. The guide assembly 180 may be configured to prevent excessive twisting or binding of the tape 140 during winding back onto the reel assembly 120. Moreover, the guide assembly 180 may be further be configured to allow facilitate extension or retraction of the tape 140 in multiple orientations by providing symmetric curved bearing surfaces, as described in greater detail below.

As noted above, the knob 134 may be rotated between a closed position and an open position. When in the open position, the operator or user may apply pressure to the knob 134 to rotate the crank 132 to operate the reel assembly 120 to wind the tape 140 onto a reel 122 (see FIG. 7A). The drawing of the tape 140 into the reel assembly 120 (and onto the reel 122) necessarily draws the tape 140 inwardly through the guide assembly 180. Moreover, the unwinding of the tape 140 from the reel 122 to facilitate measuring also necessarily draws the tape 140 outwardly through the guide assembly 180. Thus, it can be appreciated that the guide assembly 180 should effectively guide the tape 140 both for extension and retraction of the tape 140.

Meanwhile, it should also be understood that the end hook 170 is typically oriented in one direction (i.e., extending downwardly and perpendicularly relative to a top surface of the tape 140). Thus, for many conventional designs, the exit port (e.g., aperture 150 of measuring device 100) may also be configured only for extension of the tape 140 from the housing 110 in only one direction. However, right and left handed operators may have different natural inclinations about which hand to hold the measuring device 100 in while rotating the knob 134 and crank 132. If extending the tape 140 is configured only for one direction, some users may turn the measuring device 100 to the "wrong" direction relative to the configuration of the exit port, which may effectively roll the tape 140 over while retraction is conducted. As mentioned above, this can lead to binding of the tape 140 in the exit port. Thus, in addition to facilitating effective guidance of the tape 140 through both extension and retraction, the aperture 150 should also prevent binding of the tape 140 during retraction and allow retraction in any orientation that the operator may chose while doing so.

Figure 5A:
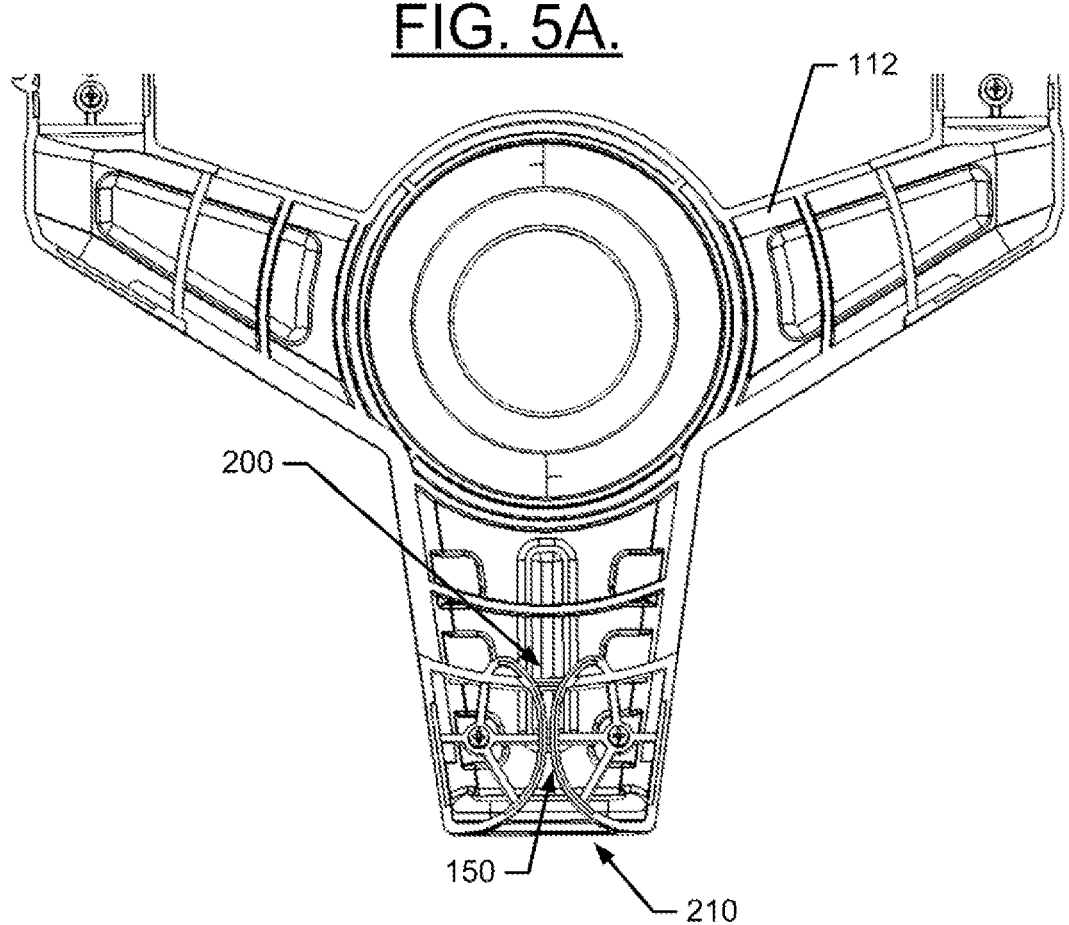
FIG. 5A illustrates an inside portion of a first case half in accordance with an example embodiment.
Figure 5B:
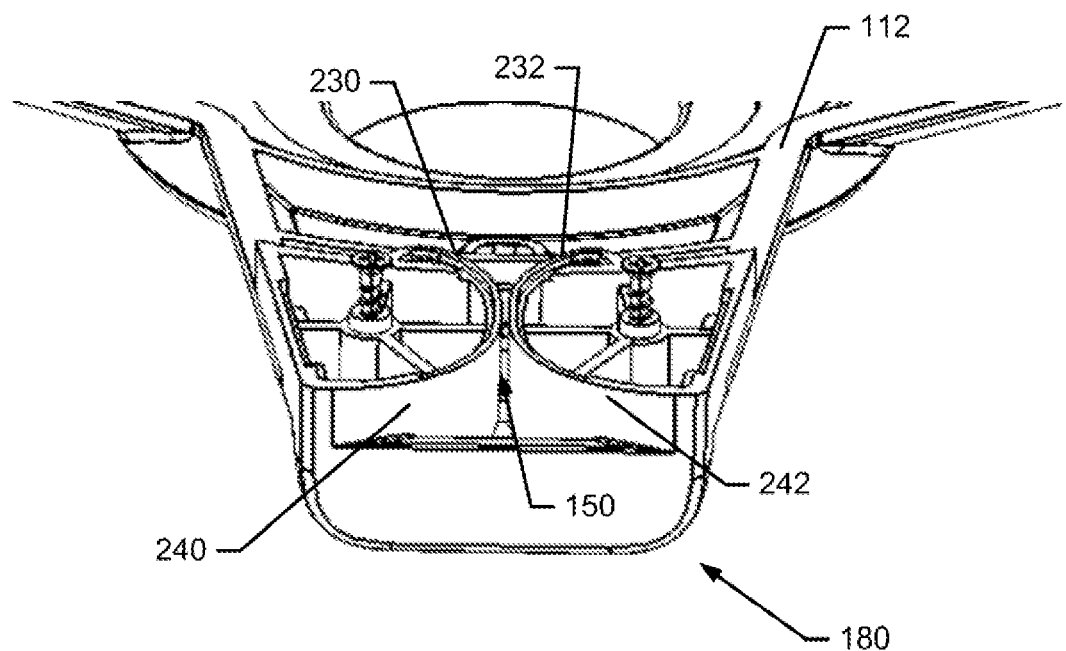
FIG. 5B illustrates a perspective view of portions of a guide assembly that are defined by the first case half in accordance with an example embodiment.
Figure 6A:
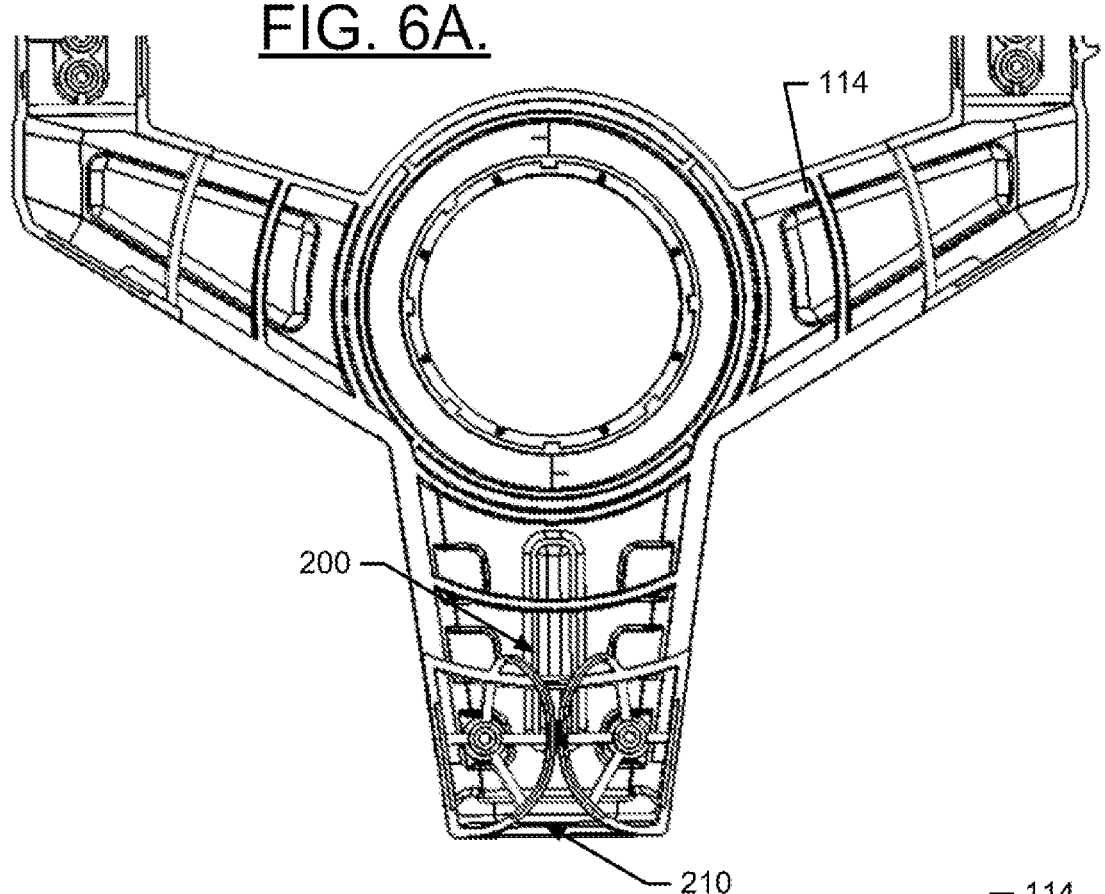
FIG. 6A illustrates an inside portion of a second case half in accordance with an example embodiment.
Figure 6B:
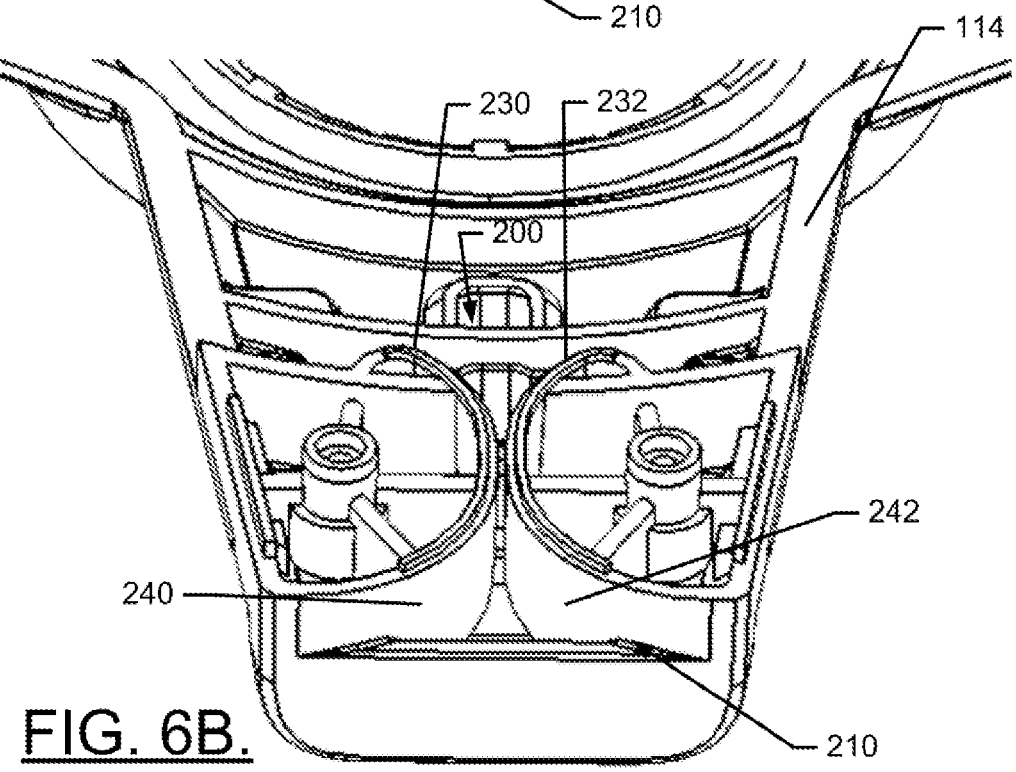
FIG. 6B illustrates a perspective view of portions of the guide assembly that are defined by the second case half in accordance with an example embodiment.
Figure 7A:
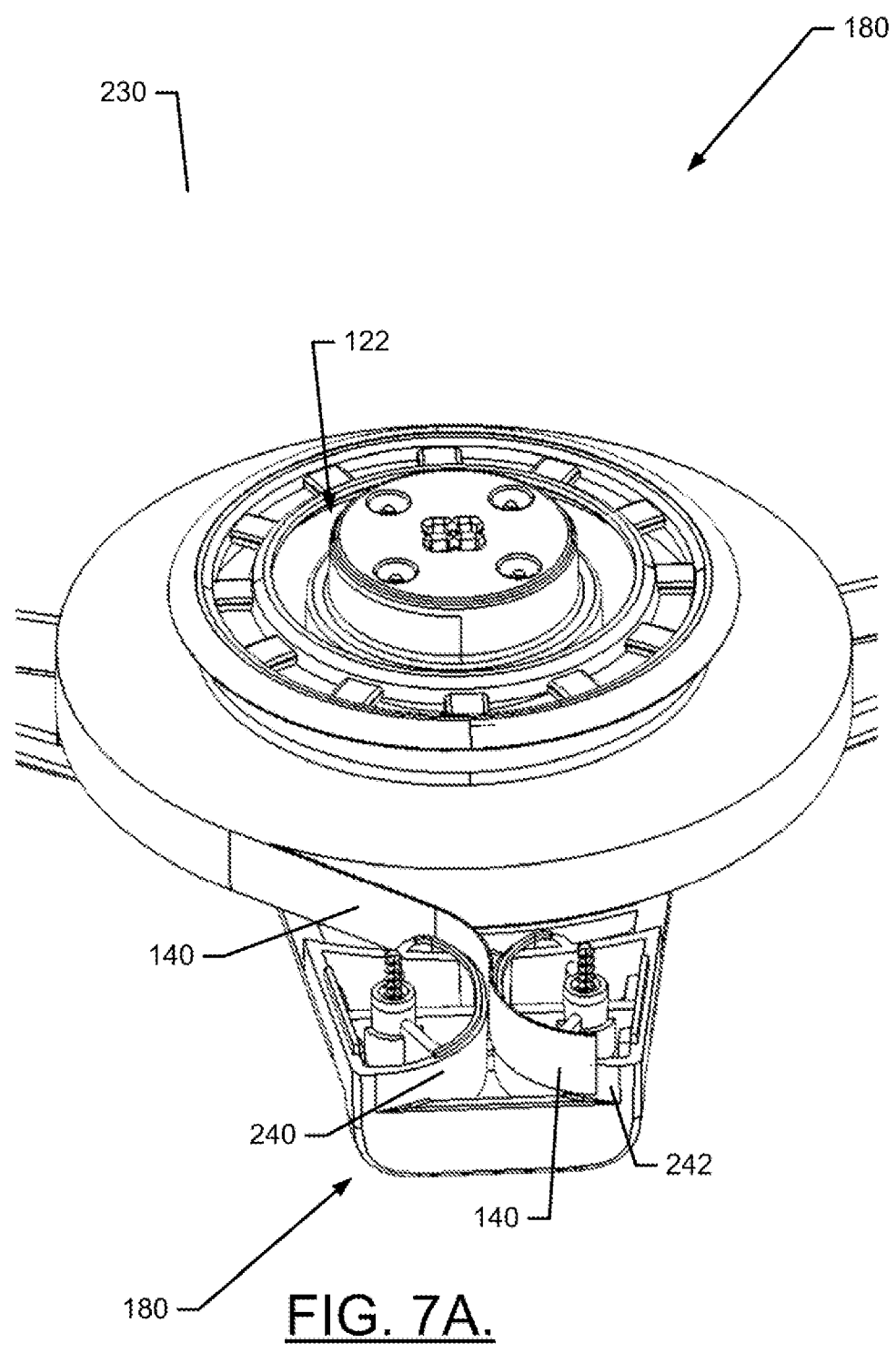
FIG. 7A is a perspective view of tape wound on a reel of a reel assembly and extending through one half of the guide assembly in accordance with an example embodiment.
Figure 7B:
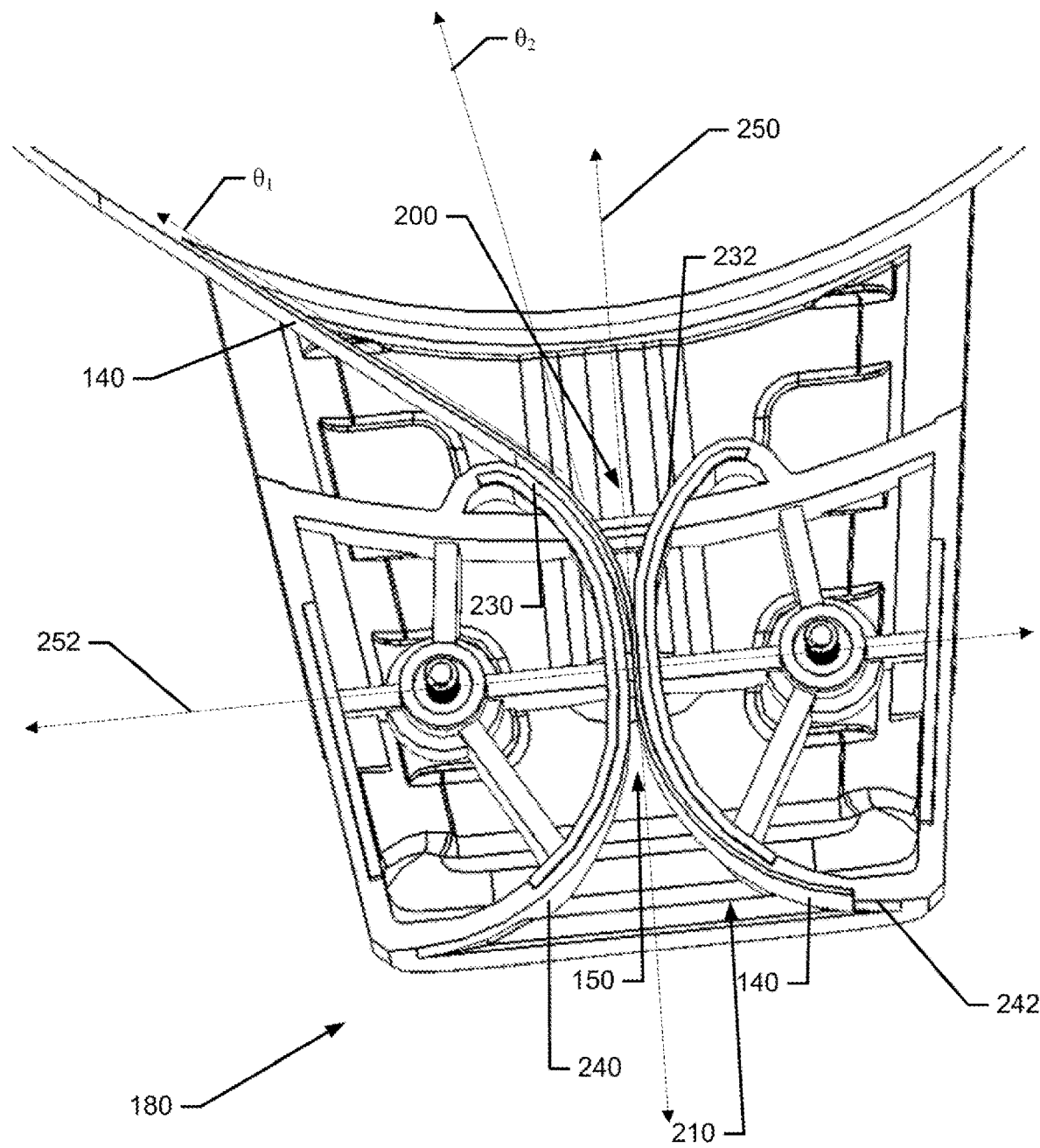
FIG. 7B is closer view of the guide assembly from FIG. 7A in accordance with an example embodiment.

To facilitate this, the guide assembly 180 is configured to include an inner guide portion 200 and an outer guide portion 210. Although only the outer guide portion 210 is visible in FIGS. 4A and 4B, both the inner and outer guide portions 200 and 210 are visible in FIGS. 5A, 5B, 6A, 6B, 7A and 7B. In this regard, FIGS. 5A and 6A illustrate views of the inside of each of the first and second case halves 112 and 114, respectively. FIGS. 5B and 6B illustrate perspective views of portions of the guide assembly 180 that are defined by each of the first and second case halves 112 and 114, respectively. FIG. 7A is a perspective view of the tape 140 wound on the reel 122 of the reel assembly 120 and extending through one half of the guide assembly 180 in accordance with an example embodiment. FIG. 7B is closer view of the guide assembly 180 from FIG. 7A in accordance with an example embodiment.

Referring now primarily to FIGS. 4A-7B, it can be appreciated that the inner guide portion 200 and the outer guide portion 210 are each formed by cooperating surfaces defined in the first and second case halves 112 and 114, respectively. The inner guide portion 200 is defined by respective portions of the first and second case halves 112 and 114 that form a first inner bearing surface 230 and a second inner bearing surface 232. The outer guide portion 210 is defined by respective portions of the first and second case halves 112 and 114 that form a first outer bearing surface 240 and a second outer bearing surface 242. The inner and outer guide portions 200 and 210 may extend toward each other and meet proximate to the aperture 150. Thus, for example, the first inner bearing surface 230 and the second inner bearing surface 232 may have a closest point of approach to each other at the aperture 150. Similarly, the first outer bearing surface 240 and the second outer bearing surface 242 may have a closest point of approach to each other at the aperture 150.

A plane 250 (see FIG. 7B) bisecting the aperture 150 may pass equidistantly in between each of the first inner bearing surface 230 and the second inner bearing surface 232. The plane 250 bisecting the aperture 150 may also pass equidistantly in between each of the first outer bearing surface 240 and the second outer bearing surface 242. Thus, the first and second inner bearing surfaces 230 and 232 may mirror each other about the plane 250 bisecting the aperture 150, and the first and second outer bearing surfaces 240 and 242 may also mirror each other about the plane bisecting the aperture 150. Meanwhile, a plane 252 in which the aperture 150 lies (which is also a plane perpendicular to the plane 250 bisecting the aperture 150) divides the first inner bearing surface 230 from the first outer bearing surface 240, and divides the second inner bearing surface 232 from the second outer bearing surface 242.

All of the bearing surfaces (i.e., the first and second inner bearing surfaces 230 and 232 and the first and second outer bearing surfaces 240 and 242) extend away from the plane in which the aperture 150 lies with an increasing slope as distance from the aperture 150 increases. As a result, the inner and outer guide portions 200 and 210 may also be defined by curved surfaces that extend away from the aperture 150 in both inward and outward directions and mirror each other on opposite sides of the aperture 150. Thus, the inner guide portion 200 may face toward the reel 122, and the outer guide portion 210 may face away from the reel 122, but the slopes provided on the corresponding bearing surfaces thereof may be continuously formed to guide the tape 140 in either direction along the first and second outer bearing surfaces 240 and 242 after the tape 140 exits the aperture 150.

As can be seen in FIGS. 4A, 4B, 7A and 7B, the tape 140 may extend against the second outer bearing surface 242 after exiting from the aperture 150 to extend to the viewer's right. However, the tape 140 could also extend over a full range of angles all the way to extending against the first outer bearing surface 240. For any angle in the full range of angles between the first and second outer bearing surfaces 240 and 242, the tape 140 will exit first or second outer bearing surfaces 240 or 242 tangent to the corresponding one of the first or second outer bearing surfaces 240 or 242.

Meanwhile, in accordance with an example embodiment, the structure of the reel assembly 120 may be such that the range of angles at which the tape 140 encounters the first inner bearing surface 230 may be more restricted. In this regard, the range of angles are shown in FIG. 7B and extend from a first angle ($\theta_1$) when the reel 122 is full due to minimal amount of the tape 140 being extended from the aperture 150 (which is the condition shown in FIG. 7B) to a second angle ($\theta_2$) when the reel 122 is empty due to all of the tape 140 being extended from the aperture 150. Even for this range of angles (i.e., between $\theta_1$ and $\theta_2$, which may be measured with respect to the plane 250 bisecting the aperture 150), the tape 140 enters the guide assembly 180 tangent to the first inner bearing surface 230. The tape 140 may not encounter the second inner bearing surface 232 (except to the extent slack is built up in the tape 140 inside the housing 110). Thus, the tape 140 may always enter the guide assembly 180 tangent to the first inner bearing surface 230, and may exit the guide assembly 180 tangent to one of the first outer bearing surface 240 or the second outer bearing surface 242.

The structures of the inner guide portion 200 and the outer guide portion 210 are therefore arranged to minimize the likelihood of any binding of the tape 140 in the aperture 150, but also facilitate extending the tape in either lateral direction after exiting the aperture 150. In this regard, the structures of the inner and outer guide portions 200 and 210 effectively form the aperture 150 in a manner that leaves little space for unwanted movement (and therefore binding) of the tape 140 in the aperture 150. As shown best in FIG. 4B, the aperture 150 may be sized and shaped such that a longitudinal length ($A_l$) of the aperture 150 is only slightly larger than a width of the tape 140. In this regard, for example, the length ($A_l$) of the aperture 150 may be less than 1.5 times the width of the tape 140. Meanwhile, a width ($A_w$) of the aperture 150 may also be only slightly larger than a thickness of the tape 140. For example, the width ($A_w$) of the aperture 150 may be less than 3 times the thickness of the tape 140.

As can be appreciated from the descriptions above, the operator may use the tape 140 in any orientation, and retract the tape 140 also in any orientation, without the tape 140 rolling over and becoming bound within the aperture 150. In some cases, the first and second case halves 112 and 114, and particularly the portions thereof that relate to the guide assembly 180 may be made by injection molding. This enables low cost and improved manufacturability.

In an example embodiment, a guide assembly for a tape measuring device (or the measuring tape device itself) may be provided. The tape measuring device may include a housing having an aperture, a reel assembly disposed in the housing, a tape having a first end operably coupled to the reel assembly and a second end configured to extend from the housing through the aperture, a retraction assembly configured to interface with the reel assembly to enable the tape, after extension from the housing to be wound onto the reel assembly, and a guide assembly provided to define the aperture. The guide assembly may include an inner guide portion facing the reel assembly, and an outer guide portion facing away from the reel assembly. The guide assembly may also be configured such that the tape encounters the guide assembly tangent to each of the inner guide portion and the outer guide portion. Alternatively or additionally, the guide assembly may be configured to enable the tape to be paid out from the aperture in both lateral directions.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the guide assembly may be configured to inhibit or prevent binding of the tape in the aperture. To accomplish this, for example, the aperture may have a length less than 1.5 times a width of the tape, and a width less than 3 times a thickness of the tape. In an example embodiment, the aperture may lie in a first plane, and a second plane that is substantially perpendicular to the first plane may bisect the aperture. The inner and outer guide portions may substantially mirror each other about the first plane. In some cases, the inner guide portion may include a first inner bearing surface and a second inner bearing surface, and the outer guide portion comprises a first outer bearing surface and a second outer bearing surface. The first and second inner bearing surfaces may mirror each other about the second plane, and the first and second outer bearing surfaces may also mirror each other about the second plane. In an example embodiment, the first and second outer bearing surfaces may extend away from the aperture with an increasing slope as distance from the aperture increases. Additionally or alternatively, the first and second inner bearing surfaces may extend away from the aperture with an increasing slope as distance from the aperture increases. In an example embodiment, the tape may encounter the inner guide portion tangent to the first inner bearing surface over a range of angles from a full reel to an empty reel condition, and the tape may encounter the outer guide portion tangent to the first outer bearing surface or the second outer bearing surface and all angles therebetween.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tape measuring device comprising:
    a housing having an aperture;
    a reel assembly disposed in the housing;
    a tape having a first end operably coupled to the reel assembly and a second end configured to extend from the housing through the aperture;
    a retraction assembly configured to interface with the reel assembly to enable the tape, after extension from the housing to be wound onto the reel assembly; and
    a guide assembly provided to define the aperture,
    wherein the guide assembly comprises an inner guide portion facing the reel assembly, and an outer guide portion facing away from the reel assembly, and
    wherein the guide assembly is configured such that the tape encounters the guide assembly tangent to each of the inner guide portion and the outer guide portion.

2. The tape measuring device of claim 1, wherein the guide assembly is configured to inhibit or prevent binding of the tape in the aperture.

3. The tape measuring device of claim 1, wherein the aperture has a length less than 1.5 times a width of the tape, and a width less than 3 times a thickness of the tape.

4. The tape measuring device of claim 1, wherein the guide assembly is configured to enable the tape to be paid out from the aperture in both lateral directions.

5. The tape measuring device of claim 1, wherein the aperture lies in a first plane, and a second plane that is substantially perpendicular to the first plane bisects the aperture,
    wherein the inner and outer guide portions substantially mirror each other about the first plane.

6. The tape measuring device of claim 5, wherein the inner guide portion comprises a first inner bearing surface and a second inner bearing surface,
    wherein the outer guide portion comprises a first outer bearing surface and a second outer bearing surface,
    wherein the first and second inner bearing surfaces mirror each other about the second plane, and
    wherein the first and second outer bearing surfaces mirror each other about the second plane.

7. The tape measuring device of claim 6, wherein the first and second outer bearing surfaces extend away from the aperture with an increasing slope as distance from the aperture increases.

8. The tape measuring device of claim 7, wherein the first and second inner bearing surfaces extend away from the aperture with an increasing slope as distance from the aperture increases.

9. The tape measuring device of claim 6, wherein the tape encounters the inner guide portion tangent to the first inner bearing surface over a range of angles from a full reel to an empty reel condition.

10. The tape measuring device of claim 9, wherein the tape encounters the outer guide portion tangent to the first outer bearing surface or the second outer bearing surface and all angles therebetween.

11. A tape measuring device comprising:
a housing having an aperture;
a reel assembly disposed in the housing;
a tape having a first end operably coupled to the reel assembly and a second end configured to extend from the housing through the aperture;
a retraction assembly configured to interface with the reel assembly to enable the tape, after extension from the housing to be wound onto the reel assembly; and
a guide assembly provided to define the aperture,
wherein the guide assembly comprises an inner guide portion facing the reel assembly, and an outer guide portion facing away from the reel assembly, and
wherein the guide assembly is configured to enable the tape to be paid out from the aperture in both lateral directions.

12. The tape measuring device of claim 11, wherein the aperture lies in a first plane, and a second plane that is substantially perpendicular to the first plane bisects the aperture,
wherein the inner and outer guide portions substantially mirror each other about the first plane.

13. The tape measuring device of claim 12, wherein the inner guide portion comprises a first inner bearing surface and a second inner bearing surface,
wherein the outer guide portion comprises a first outer bearing surface and a second outer bearing surface,
wherein the first and second inner bearing surfaces mirror each other about the second plane, and
wherein the first and second outer bearing surfaces mirror each other about the second plane.

14. The tape measuring device of claim 13, wherein the first and second outer bearing surfaces extend away from the aperture with an increasing slope as distance from the aperture increases, and
wherein the first and second inner bearing surfaces extend away from the aperture with an increasing slope as distance from the aperture increases.

15. The tape measuring device of claim 14, wherein the tape encounters the outer guide portion tangent to the first outer bearing surface or the second outer bearing surface and all angles therebetween.

16. A guide assembly for a tape measuring device, the guide assembly comprising:
an inner guide portion facing a reel assembly of the tape measuring device, and
an outer guide portion facing away from the reel assembly,
wherein the guide assembly is configured to enable the tape to be paid out from an aperture of the tape measuring device in both lateral directions relative to the aperture.

17. The guide assembly of claim 16, wherein the aperture lies in a first plane, and a second plane that is substantially perpendicular to the first plane bisects the aperture,
wherein the inner and outer guide portions substantially mirror each other about the first plane.

18. The guide assembly of claim 17, wherein the inner guide portion comprises a first inner bearing surface and a second inner bearing surface,
wherein the outer guide portion comprises a first outer bearing surface and a second outer bearing surface,
wherein the first and second inner bearing surfaces mirror each other about the second plane, and
wherein the first and second outer bearing surfaces mirror each other about the second plane.

19. The guide assembly of claim 18, wherein the first and second outer bearing surfaces extend away from the aperture with an increasing slope as distance from the aperture increases, and
wherein the first and second inner bearing surfaces extend away from the aperture with an increasing slope as distance from the aperture increases.

20. The guide assembly of claim 19, wherein the tape encounters the inner guide portion tangent to the first inner bearing surface over a range of angles from a full reel to an empty reel condition, and
wherein the tape encounters the outer guide portion tangent to the first outer bearing surface or the second outer bearing surface and all angles therebetween.

\* \* \* \* \*